Nov. 17, 1959   B. JANAS   2,913,002
ROTATING PICK-UP UNIT
Filed Aug. 14, 1957

INVENTOR.
B. JANAS
BY
ATTORNEYS

United States Patent Office 2,913,002
Patented Nov. 17, 1959

2,913,002

ROTATING PICK-UP UNIT

Bronislaus Janas, Avon, Ohio

Application August 14, 1957, Serial No. 678,253

6 Claims. (Cl. 137—580)

(Granted under Title 35, U.S. Code (1952), sec. 266)

The invention described herein may be manufactured and used by or for the Government of the United States of America for governmental purposes without the payment of any royalties thereon or therefor.

The present invention relates to a pick-up unit and particularly to a pick-up unit for transferring pressure and temperature values from a rotating element to a stationary element.

Heretofore, various modifications of rotating pressure and electrical pick-up devices have been known and are generally of the non-indexing or indexing types. The non-indexing types, one of which is shown in U.S. Patent No. 2,633,744, are relatively complicated in structure and require a multiple number of parts.

The indexing type, which normally having a lesser number of parts than the non-indexing type, have heretofore had the disadvantage of not being capable of being indexed during rotation, and consequently the machine under test was stopped each time a different point was to be tested for either pressure or temperature.

The present invention employs a novel indexing device that permits indexing at any speed by a simple movement in a direction parallel with the axis of rotation of the device being tested. With the improved indexing mechanism disclosed herein, a multiple number of pressure or electrical readings can be made with only two or three rotating take-off points, thus reducing considerably the number of parts required.

It is therefore a general object of the present invention to provide an improved indexing type pick-up unit that can be indexed during rotation.

Another object of the present invention is to provide an improved device for transmitting pressures and temperatures from a rotating object to a stationary object.

Other objects and advantages of the present invention will be readily apparent from the following detailed description when taken together with the accompanying drawing wherein.

Figure 1:
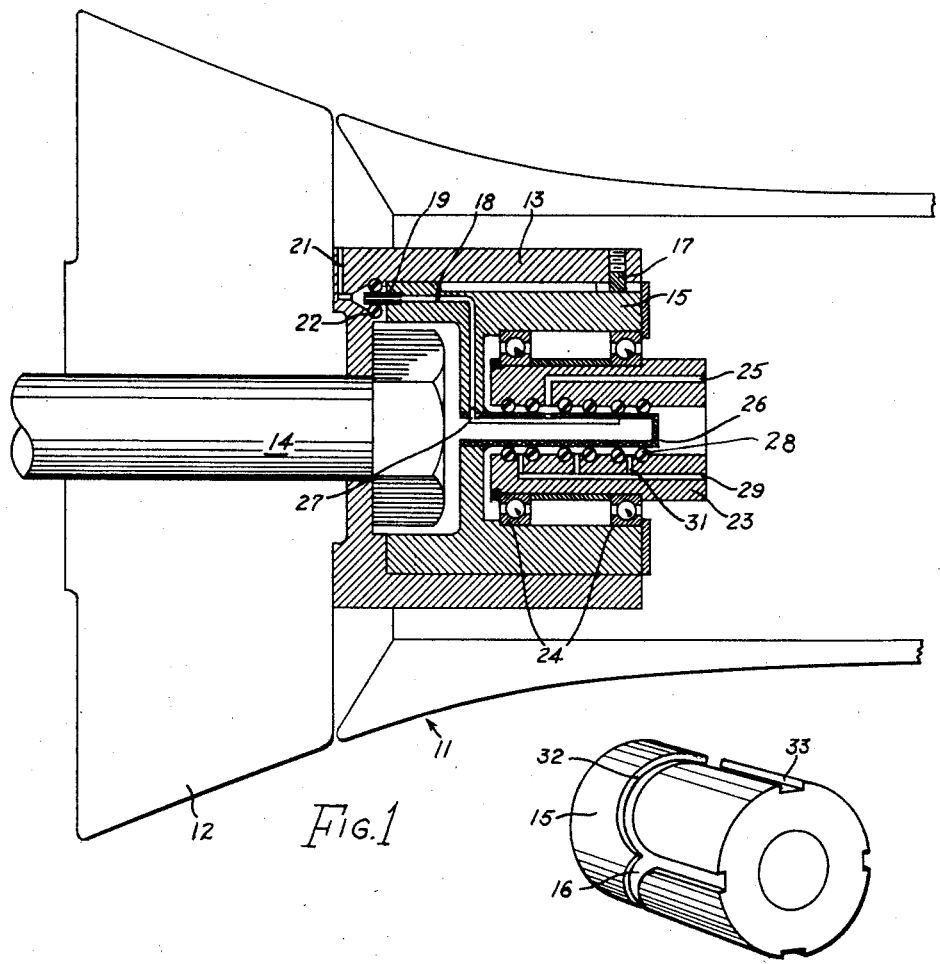
Figure 1 is a sectional view showing the invention in use on a rotor of a compressor unit.
Figure 2:
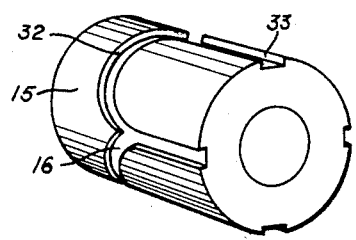
Figure 2 is a perspective view of an indexing element.

Referring now to Figure 1 of the drawing, there is shown a compressor, generally designated 11, having a rotor 12 to which an adapter member 13 is attached by means of bolt 14. A cylindrical indexing member 15, shown in more detail in Figure 2 of the drawing, is slidably positioned within an open space in adapter member 13 and rotatable therewith. The indexing member 15 has a plurality of cam grooves 16 on the outer periphery thereof, four being shown for purposes of illustration, and a guide pin 17 that is threadedly attached to adapter member 13, is engageable with these grooves.

A plurality of passageways 18 are provided within indexing member 15 and an extension tube 19 is provided for each passageway. Adapter member 13 is also provided with a plurality of passageways 21 and the extension tubes 19 are engageable therewith, as shown in Figure 1 of the drawing. A resilient O ring 22 is provided to make a sealed connection so that pressure can be transferred from passageway 21 to passageway 18 without loss.

A stationary take-off member 23 is mounted within the bore of indexing member 15 by means of bearings 24, and a plurality of passageways 25 are provided therein. A tubular portion 26 is attached, as by welding, to the indexing member 15, and connecting tubes 27 connect passageways 18 and 25. A plurality of resilient O rings 28 are interposed between the outside diameter of the connecting tube 27 and the inside diameter of the stationary take-off member 23. These O rings 28 prevent a loss of pressure between connecting tubes 27 and the passageways 25 in the stationary member 23. A lubrication system comprised of a main passageway 29 and a plurality of feeder lines 31 is provided to reduce the friction between the O rings 28 and the tubular portion 26.

During operation, the rotor 12 is normally rotating at high speed and the indexing member 15 is encompassed by adapter member 13. When it is desired to check the pressure at a different location in the rotor, the stationary take-off member 23 is moved away from the rotor 12 in a direction parallel with the axis of rotation. Movement of the stationary take-off member 23 away from the rotor 12 causes the indexing member to be moved, likewise, in a direction parallel with the axis of rotation. However, guide pin 17, which is threadedly attached to adapter member 13 and is engageable with grooves 16 in the indexing member, causes the indexing member to be rotated relative to adapter member 13. The indexing member 15 is rotated and moved away from rotor 12 until guide pin 17 is positioned in the bottom of the turning portion 32 of the groove 16. Movement of the stationary take-off member 23 toward the rotor 12 causes the indexing member 15 to complete its rotational cycle and a different pressure point in the rotor is connected to the stationary member 23. It should be noted that the cam groove 16 in the indexing member 15 has a straight portion 33 and thus it can be seen that the extension tube 19 can be withdrawn from the adapter 13 before the indexing unit 15 is rotated relative to the adapter member 13.

Figure 3:
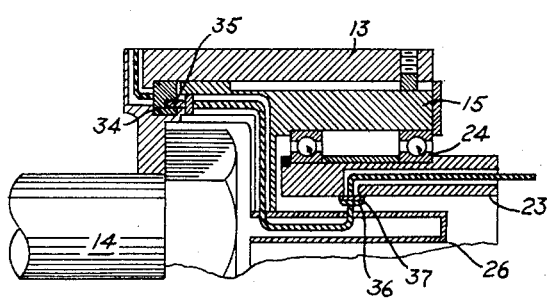
Figure 3 is a partial sectional view showing an electrical pick-up arrangement.

In Figure 3 of the drawing there is shown an embodiment, similar in indexing operation to the one shown in Figure 1, wherein current can be transferred from a rotating member to a stationary member. This embodiment may have use when it is desired to measure the temperature within a rotating element by using a thermocouple. A plurality of sockets 34 are provided within adapter member 13 and a plug 35 is provided within indexing member 15 and so arranged to be engageable with the sockets 34. It can readily be seen that as indexing member 15 is indexed that different circuits are completed. A standard brush 36 and slip-ring 37 are provided to transfer current to the stationary member 23. Obviously more than one circuit could be employed at the same time, one being shown for the purpose of illustration.

From the foregoing description it can be seen that the present invention readily permits indexing at any speed without stopping the rotor. With the improved device herein disclosed, numerous pressure or electrical readings can be made with only a few rotating take-off points; thus the size of the unit can be reduced.

Obviously many modifications and variations of the present invention are possible in the light of the above teachings. It is therefore to be understood that the invention may be practiced otherwise than as specifically described.

What is claimed is:

1. An indexing device for a rotating member comprising, a stationary take-off member adaptable for linear motion, a cylindrical indexing member having a plurality of cam grooves on the outer periphery thereof, each said cam groove consisting of a straight portion and a turning portion, journal means for rotatably supporting said cylindrical indexing member about said stationary take-off member, means for preventing axial movement between said stationary take-off member and said cylindrical indexing member, an adapter member slidably positioned about the outer periphery of said indexing member, and pin means on said adapter member for engaging said grooves in said cylindrical indexing member whereby linear motion of said stationary take-off member during rotation of said adapter member causes rotation of said indexing member relative to said adapter member.

2. An indexing device as set forth in claim 1 wherein said stationary take-off member and said indexing member each have at least one passageway therein, and said adapter member has a plurality of passageways angularly spaced about the longitudinal axis thereof, whereby indexing said indexing member connects said passageway in said stationary take-off member with different passageways in said adapter member.

3. An indexing device for a rotating member comprising; an adapter member having an open space and a plurality of passageways angularly spaced about the longitudinal axis thereof and adaptable for mounting to said rotating member; a cylindrical indexing member slidably positioned in said open space and having a plurality of cam grooves on the outer periphery thereof and having at least one passageway therein, each said cam groove consisting of a straight portion and a turning portion; pin means on said adapter member for engaging said cam grooves and rotating said indexing member relative to said adapter member when said adapter member is rotating; a stationary take-off member non-rotatably mounted inside said indexing unit and having at least one passageway therein; and means for preventing axial movement between said stationary take-off member and said cylindrical indexing member, whereby axial movement of said stationary take-off member during rotation of said adapter member causes rotation of said indexing member relative to said adapter member thereby connecting said passageway in said stationary take-off member with different passageways in said adapter member.

4. A rotating pressure pick-up device comprising; an adapter member having a plurality of pressure intake ports angularly spaced about the longitudinal axis thereof, and an open space and adaptable for mounting to a rotating member; a cylindrical indexing member having at least one fluid passageway therein and a plurality of cam grooves on the outer periphery thereof, each said cam groove consisting of a straight portion and a turning portion, said indexing member being slidably positioned within said open space in said adapter member; pin means on said adapter member for engaging said cam grooves and rotating said indexing member relative to said adapter member; a stationary take-off member having at least one pressure outlet port; means for preventing axial movement between said stationary take-off member and said cylindrical indexing member whereby axial movement of said stationary take-off member during rotation of said adapter member causes rotation of said indexing member relative to said adapter member thereby connecting said at least one pressure outlet port to different pressure intake ports; and sealing means for providing seals between said indexing member and said adapter member and between said indexing member and said stationary take-off member.

5. A rotating electrical pick-up device comprising, an adapter member having an open space and adaptable for mounting to a rotating member, a plurality of electrical sockets angularly spaced about the longitudinal axis of said adapter, a cylindrical indexing member having at least one passageway therein and having a plurality of cam grooves on the outer periphery thereof, each said cam groove consisting of a straight portion and a turning portion, said indexing member being slidably positioned within said open space and rotatable with said adapter, at least one electrical conductor within said passageway, said conductor having an electrical plug connected on one end thereof and adaptable for engaging said electrical sockets in said adapter member, pin means on said adapter member for engaging said cam grooves and rotating said indexing member relative to said adapter member during rotation of said adapter member, a stationary pick-up member non-rotatably mounted within said indexing member and having at least one outlet circuit therein, said outlet circuit having contacting means for engaging one end of said at least one electrical conductor in said indexing member, and means for preventing axial movement between said stationary take-off member and said cylindrical indexing member.

6. A rotating electrical pick-up device as set forth in claim 5 wherein said contacting means includes a slip ring attached to said stationary pick-up member.

References Cited in the file of this patent

UNITED STATES PATENTS

| | | |
|---|---|---|
| 623,873 | Borden | Apr. 25, 1899 |
| 1,405,177 | Zahn | Jan. 31, 1922 |